G. F. FETSCHER.
CHANGEABLE SIGN.
APPLICATION FILED AUG. 27, 1914.
Reissued Apr. 6, 1915. 13,896.
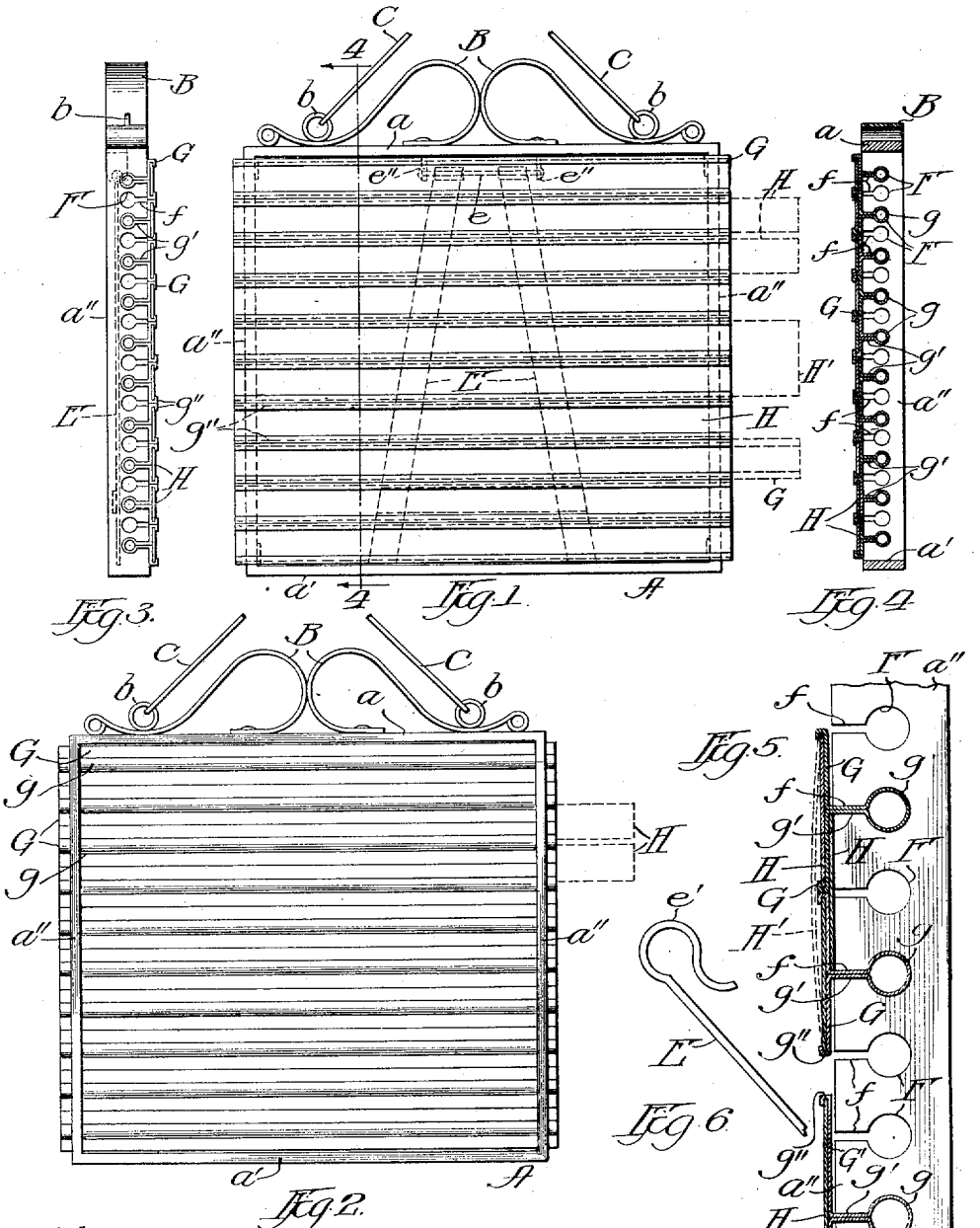
Witnesses:
Geo. C. Darrow
C. Niederhofer
Inventor:
George F. Fetscher
By Bell & Huxley Attys
THE NORRIS PETERS CO., PHOTO-LITHO., WASHINGTON, D. C.

UNITED STATES PATENT OFFICE.

GEORGE F. FETSCHER, OF CHICAGO, ILLINOIS, ASSIGNOR TO SPENGLER BROTHERS COMPANY, OF CHICAGO, ILLINOIS, A CORPORATION OF ILLINOIS.

CHANGEABLE SIGN.

13,896. Specification of Reissued Letters Patent. Reissued Apr. 6, 1915.

Original No. 1,058,739, dated April 15, 1913, Serial No. 737,663. Application for reissue filed August 27, 1914. Serial No. 858,986.

*To all whom it may concern:*

Be it known that I, GEORGE F. FETSCHER, a citizen of the United States, residing at Chicago, in the county of Cook and State of Illinois, have invented certain new and useful Improvements in Changeable Signs, of which the following is a specification.

This invention relates to devices which are used for advertising and other purposes, by means of which an advertisement or announcement may be made, either of a permanent or transient character, and which will permit a change to be made at any time, either in the appearance or wording thereof. And the object of this invention is to obtain a device which is presentable in appearance; which permits but does not require the entire surface on either or both sides thereof to be wholly covered by an advertisement or announcement; which permits a change to be made in said advertisement or announcement, either by substituting a duplicate part or parts of the device for one or more previously in use, or by withdrawing the whole or a part of the lettering of said advertising or announcement and replacing it with different lettering, without the withdrawal of said duplicate parts; which permits the building up of an advertisement or announcement letter by letter or line by line, as preferred; which affords means to vary the height of the letters or words in different lines; which is easily manipulated, requiring no special skill on the part of the operator thereof; which can be used as a hanging device or as an easel adapted to be placed upon a desk or table, or other place; which is economically made, and durable; and which is adapted to receive any one of a large number of lines or letters which may be kept in stock.

In the drawing Figure 1 is a front view of a device embodying the invention. Fig. 2 is a rear view of the device which is illustrated in Fig. 1. Fig. 3 is an end view of said device. Fig. 4 is a sectional view on line 4—4 of Fig. 1, viewed in the direction indicated by the arrows. Fig. 5 is an enlarged view similar to Fig. 4, showing a portion of the device with a different arrangement of sign elements. And Fig. 6 is a side elevation of the upper end of the easel supporting member of the device.

A reference character applied to designate a given part indicates said part throughout the several figures of the drawing, wherever the same appears.

A is the frame of the device, and consists of the top and bottom bars, $a$, $a'$, and the side bars $a''$.

B is an ornamental design which is mounted on bar $a$, and $b$, $b$ are eyelets through which the cord C extends when the device is to be hung up.

E are legs which are hinged to bar $a$ by pintle $e$, when the device is to be used on a desk or table as an easel. The upper end of one of the legs E is illustrated in Fig. 6, and by making the legs E of spring metal, as sheet brass, the curved end $e'$ can be forced on to and removed from the pintle $e$, without removing said pintle from the lugs $e''$.

The side bars $a''$ are duplicates, and are respectively provided with the apertures F, which are regularly spaced, and the slots $f$ which communicate with said apertures F.

G are metal slides, and I make them by bending them up from a number of sheet metal ribbons. Slides G are provided with the ribs $g$, which fit with a sliding fit in the apertures F, and the ribs $g'$ which fit similarly in the slots $f$. Said slides are also provided with the grooves $g''$ on the top and bottom edges thereof, and H are strips which I make of cardboard, and also of metal, which fit loosely in the grooves $g''$. When strips H are used to build up an advertisement or announcement on the back of the device said strips will fit in between any two of the slides G, as is well illustrated in Fig. 5.

G′, Fig. 5 is a slide which is wider in front thereof than is slide G, and a wider strip H may be used to fit therein. Whatever may be the width of the slides on the front face thereof the ribs $g$, $g'$ are made of the same size as illustrated in the drawings, relative to the size of the apertures F and slots $f$. That is, the ribs $g$ fit with a sliding fit in the apertures F, and the ribs $g'$ fit similarly in the slots $f$.

Whatever the width of the front of the slides G is, a strip (H′) indicated by broken lines in Fig. 5, may be made to cover a plurality of said slides from view, and of suitable width so that the upper edge thereof fits into the upper groove of the top slide, and the lower edge thereof in the lower groove of the bottom slide. By this means a larger letter or character may be used for any desired word or line than the remainder of the advertisement or announcement which is desired to be made. It will be evident that the length of the strip H need not correspond with the length of the slides G, but may be made longer or shorter, as preferred. When made shorter a plurality of said strips may be inserted in a given slide, and when made longer the said strip will extend beyond the ends of said slide.

To change the advertisement or announcement which is displayed in this device the slides, or some of them, may be removed from the frame A, and different ones substituted therefor; or some or all of the strips H may be withdrawn from the slides G and different strips put in place thereof.

The ribs $g'$ are made longer than the slots $f$, so that the bodies of the slides G stand out a slight distance from the front face of frame A, so that a given strip H may be slid in between the back of said slides and the side bars $a''$ and between the ribs $g'$ of adjacent slides. This construction permits a sign to be built up on the back of the device using strips of a width which will slide in the grooves $g''$, as strips of this width will also slide between any two of said slides G on the back thereof.

It will appear from the above that the desired printed matter to be displayed by the sign may be in the form of sections or separate letters in any supporting slide, or, if preferred, the printed matter in any slide may be in the form of a continuous strip and that the sign may be changed either by removing the printed matter from the slides and substituting other printed matter, or by providing the slides in any desired manner with printed matter which may remain in association with the slides and changing the sign by removing any desired one or ones of the slides from the frame and substituting others therefor since the slides are constructed so they may be readily mounted upon or removed from the frame as desired. Furthermore, it will also appear that the printed matter carried on the front of the sign may be given any desired arrangement limited only by the dimensions of the slides and the number of them employed since any particular letter or letters may be carried by a single slide or extend over a plurality of slides, and that the printed matter carried by the back of the sign may be given any arrangement permitted by the size and disposition of the slides supported by the frame, for, as pointed out above, while it is desirable to provide the frame with a plurality of slide supporting devices equally spaced, the slides may be either of the same height as this spacing or of some other height, and by taking the height of the slides of various multiples of said spacing, sign elements may be used on the back of the sign which have corresponding heights.

While the construction particularly described above constitutes a desirable embodiment of my invention, it will be understood that the invention may be realized by other equivalent structures, the essential thing being that any such construction shall provide a framework for interchangeably supporting either in one or two display planes as desired a plurality of sign elements, and that these elements shall consist of any desired character or group of characters supported by suitable slides or supporting members from said framework.

What I claim is:

1. In a changeable sign, a frame the side walls whereof are provided with apertures and with slots communicating with said apertures, slides respectively provided with ribs fitting into said apertures, said ribs attached to said slides by additional ribs which fit in said slots, and said slides provided with grooves on the upper and lower edges thereof upon their front faces, in combination with strips, the upper and lower edges of said strips adapted to fit in said grooves.

2. In a changeable sign, a frame the side walls whereof are provided with apertures and with slots communicating with said apertures, in combination with slides made of sheet metal and bent up to obtain ribs fitting into said apertures, additional ribs joining said first named ribs to the body of said slides, and grooves on the upper and lower edges of said body part, said additional ribs fitting in said slots, and strips adapted to fit in said grooves.

3. In a changeable sign, a frame the side walls whereof are provided with apertures and with slots communicating with said apertures, slides respectively provided with ribs fitting into said apertures and additional ribs fitting in said slots, said additional ribs being deeper than said slots to position said slides a determined distance from said frame, and grooves on the upper and lower edges of the front of said slides, in combination with strips adapted to fit in said last named grooves and between said additional ribs of adjacent slides, and between the backs of said slides and the front of said frame.

4. In a changeable sign, the combination of a framework having a plurality of supporting surfaces, and a plurality of sign supports for carrying sign elements on their front faces and having projections for interchangeably engaging said supporting surfaces, said projections and framework constituting supports for sign elements on the back faces of said sign supports.

5. In a changeable sign, the combination of a framework having spaced apertures, and sign supports for carrying sign elements on their front faces and having projecting ribs for interchangeably engaging said apertures, said ribs constituting a support for sign elements on the rear face of said sign supports.

6. In a changeable sign, the combination of a framework having substantially parallel side bars provided with apertures extending through them and opening through the edges of said bars, and sign supports having ribs projecting from their back faces for interchangeable sliding engagement with said apertures.

7. In a changeable sign, the combination of a framework having substantially parallel side bars provided with apertures extending through them and opening through the edges of said bars, and sign supports having ribs projecting from their back faces for interchangeable sliding engagement with said apertures, said ribs constituting supports for interchangeable sign elements on the rear face of said sign supports.

8. In a changeable sign, the combination of a framework having side bars provided with apertures having restricted openings through the edges of said bars, and sign supports provided with projecting ribs having enlarged heads for interchangeable sliding engagement with said apertures, said sign supports formed for interchangeable sliding engagement with sign elements.

9. In a changeable sign, the combination of a framework having side bars provided with apertures through the edges of said bars, and sign supports provided with projecting ribs for interchangeable sliding engagement with said apertures, said sign supports formed for interchangeable sliding engagement on their front faces with sign elements, said ribs being of sufficient length to provide a clearance between the rear face of said sign supports and said framework to permit the insertion on the rear face of said sign supports between said ribs of desired sign elements.

In witness whereof, I hereunto subscribe my name this 24th day of August, A. D., 1914.

GEORGE F. FETSCHER.

Witnesses:
HENRY M. HUXLEY,
H. C. JACOBS.

Copies of this patent may be obtained for five cents each, by addressing the "Commissioner of Patents, Washington, D. C."